F. G. KEYES.
METHOD OF PREPARING CRUCIBLES FOR PREPARING FUSED QUARTZ.
APPLICATION FILED APR. 8, 1915.
1,249,637.
Patented Dec. 11, 1917.
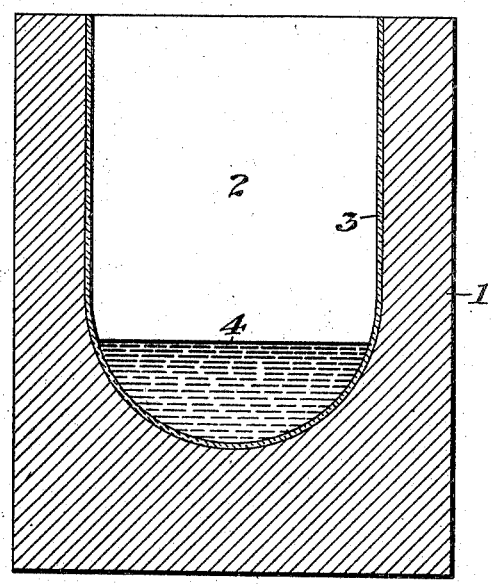
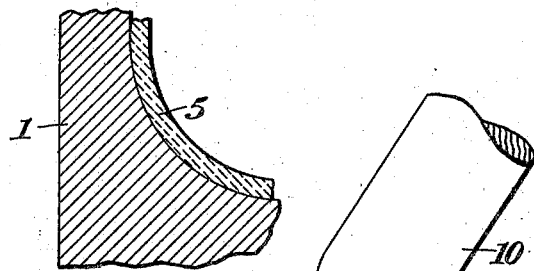
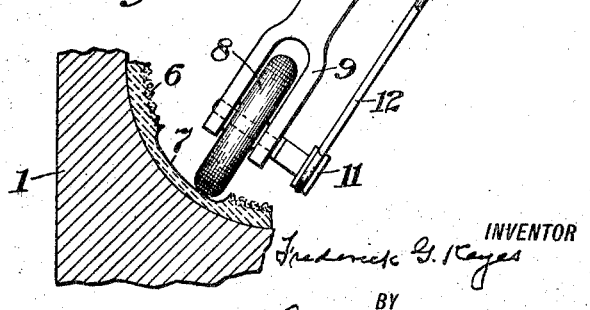
WITNESSES
INVENTOR
Frederick G. Keyes
BY
ATTORNEY

UNITED STATES PATENT OFFICE.

FREDERICK G. KEYES, OF HOBOKEN, NEW JERSEY, ASSIGNOR TO COOPER HEWITT ELECTRIC COMPANY, OF HOBOKEN, NEW JERSEY, A CORPORATION OF NEW JERSEY.

METHOD OF PREPARING CRUCIBLES FOR PREPARING FUSED QUARTZ.

1,249,637.     Specification of Letters Patent.     Patented Dec. 11, 1917.

Original application filed July 1, 1913, Serial No. 776,756. Divided and this application filed April 8, 1915. Serial No. 19,921.

*To all whom it may concern:*

Be it known that I, FREDERICK G. KEYES, a citizen of the United States, and resident of Hoboken, county of Hudson, State of New Jersey, have invented certain new and useful Improvements in Methods of Preparing Crucibles for Preparing Fused Quartz, of which the following is a specification.

My invention relates to the art of preparing fused quartz which is used for the making of many kinds of articles, for example, for containers for mercury vapor electric apparatus. My invention covers more particularly the preparation of a crucible adapted for the fusing of this material. One of the difficulties met in the treating of very refractory substances, of which silica is only one representative, is the obtaining of crucibles suitable for withstanding the high temperatures involved and at the same time to be neutral with regard to the substances being fused or heated. It is well known that carbon or graphite resists heat in a very satisfactory manner at these high temperatures where no oxygen is present to combine with the carbon, but for many substances carbon is an undesirable material for a crucible on account of its tendency to react chemically upon them. Many substances will form carbids under the condition of high temperature when in contact with carbon.

My plan is to utilize carbon for its excellent heat resisting power, its chemical qualities, its cheapness and the facility with which it may be worked and to prevent reaction between the crucible and the charge by keeping the two out of contact as by the insertion of a tight lining between the charge and the exposed wall of the crucible. I have found that among the various materials that may be used for such a lining and which are inert with regard to various substances that may be operated upon, such as fused silica, a product obtained from a compound of tungsten is of great value. In virtue of its refractory nature, however, tungsten is not only expensive but difficult to manipulate and is hardly known in large thin pieces.

My invention includes, however, a method for producing a tight lining in a carbon or graphite crucible or crucible of similar material which is cheap and effective. My process and the apparatus used in this application are shown in the accompanying drawings in which Figure 1 shows the crucible finished with a quantity of fused material therein; Fig. 2 shows a fragment of the crucible in the initial stage of the preparation; and Fig. 3 shows the finishing stages.

In the first figure, 1 represents a hollow carbon or graphite shell or foundation so shaped as to stand firmly on a base and to hold the desired quantity of charge. 2 represents the charge chamber, 3 the tungsten lining and 4 the molten charge which may be, as already described, of silica. The lining, 3, is tight to prevent any contact between the charge and the carbon and also may be made, if desired, to have a tight hold on the surface of the material of the crucible. The process of preparation of this lining is as follows. I first make a paste or liquid mixture of some tungsten compound having a volatile element as, for example, sodium tungstate with some solvent or binder such, for example, as sodium silicate and apply this paste intimately to the surface of the crucible. This mixture contains tungsten, sodium, silica and water. This stage of the preparation is shown in Fig. 2. When the paste has become somewhat dry I heat it, gradually raising the firing higher and higher. If this is fired sufficiently high, the residuum is refractory and inert chemically. To transform the rough, spongy surface to a smooth, closed surface, I may use a spinning tool as shown in Fig. 3 applied while the lining is hot in which state it is plastic and can be spun as shown in this figure. I may use for this spinning any of the usual spinning devices such, for example, as a high velocity wheel carried in bearings which can be guided or applied by hand, if desired.

In Fig. 2, 1 is the carbon of the crucible described above and 5 is the unheated mixture of paste of sodium tungstate and sodium silicate, shown as applied on a small surface of the crucible, and in Fig. 3 which shows the crucible after the firing, 6 is the rough or frittered surface of the lining, 7 is a portion of the finished surface, 8 is the spinning wheel, 9 the bearings for the spinning wheel, 10 the handle, 11 a pulley on the shaft of the wheel 8, and 12 a belt for driving the pulley at a high speed. When the whole surface has been gone over like the surface 7 of Fig. 3, the crucible is complete and ready for use.

It is well oftentimes in carrying out the heating or igniting of the crucible and the paste to keep the crucible in a reducing atmosphere, as for example an atmosphere of hydrogen to prevent the injurious effect of oxygen on the lining.

I have described a product obtained from a tungsten compound as a material for the lining of my crucible but do not wish to be limited to this material for there are other refractory chemically inert materials very well adapted for certain uses of my apparatus. Neither do I wish to limit myself to carbon for other refractory material which needs a lining or any material which may be substituted therefor falls within the scope of the present invention. Neither do I wish to limit myself to the interior lining of a pocket as shown, but include within my invention the covering of any surface with said lining or equivalent material where protection is required from some exposure. One salient character of my invention resides in the lining or covering and the method of producing the lining or covering as set forth herein.

I may state that since the co-efficient of expansion of product of the present process is 0.0000035 and that that of graphite is of the same order of magnitude, that the lining in the crucible will not be unduly strained by expansion and contraction. I would recommend a temperature of a thousand degrees centigrade or higher for the spinning of the lining.

This case is a division of my application Serial Number 776,756, filed July 1st, 1913.

I claim as my invention:

1. The method of forming a crucible for fusing refractory materials which consists in lining a carbon shell with a paste containing a refractory metal compound and a suitable binder, igniting said paste and said shell, and spinning or rubbing the residue of the paste to produce a more firm and compact surface thereon.

2. The method of preparing a crucible for the preparation of fused quartz which consists in preparing a carbon shell for said crucible and preparing a paste of tungstate of sodium and a suitable binder, putting this paste over the inner surface of the carbon shell, igniting the crucible, and spinning or rolling down the residual residuum to form a closed tight surface.

Signed at New York in the county of New York and State of New York this 1st day of April, A. D. 1915.

FREDERICK G. KEYES.

Witnesses:
WM. H. CAPEL,
THOS. H. BROWN.

Copies of this patent may be obtained for five cents each, by addressing the "Commissioner of Patents, Washington, D. C."